US000001230H

United States Statutory Invention Registration [19]

[11] Reg. Number: H1230

Stern et al.

[43] Published: Sep. 7, 1993

[54] MICROSTRIP FREQUENCY-SCAN ANTENNA

[75] Inventors: Richard A. Stern, Allenwood; Richard W. Babbitt, Fair Haven, both of N.J.

[73] Assignee: The United States of America as represented by the Secretary of the Army, Washington, D.C.

[21] Appl. No.: 832,837

[22] Filed: Feb. 7, 1992

[51] Int. Cl.[5] ..... H01Q 13/00

[52] U.S. Cl. ..... 343/700 MS; 343/767

[58] Field of Search ..... 343/700 MS File, 770, 343/767, 768, 778, 787

[56] References Cited

U.S. PATENT DOCUMENTS

| | | | |
|---|---|---|---|
| 4,689,584 | 8/1987 | Sequeira | 343/700 MS |
| 4,754,237 | 6/1988 | Stern et al. | 333/1.1 |
| 4,839,659 | 6/1989 | Stern et al. | 343/700 MS |
| 4,879,562 | 11/1989 | Stern et al. | 343/700 MS |

OTHER PUBLICATIONS

Richard A. Stern and Richard W. Babbitt, "A MM--Wave Homogeneous Ferrite Phase Scan Antenna," *Microwave Journal*, Apr. 1987, pp. 101-108.

J. Borowick, W. Bayha, R. A. Stern, R. W. Babbitt, "Inertialess Scan Antenna Techniques for Millimeter Waves" 9th *DARPA/Tri-Service MMWave Conference Record*, 1981.

M. Collier, "Microstrip Antenna Array for 12GHz TV," *Microwave Journal*, vol. 20, No. 9, pp. 67-71.

*Primary Examiner*—Bernarr E. Gregory

*Attorney, Agent, or Firm*—Michael Zelenka; William H. Anderson

[57] ABSTRACT

An antenna comprises a microstrip transmission line which includes a strip conductor and a ground plane conductor separated by a dielectric substrate; a portion of the substrate being adapted to enable energy within the substrate to radiate away from the microstrip transmission line. To permit frequency-scanning, the substrate has an antenna portion formed therein which is adapted to permit RF energy supplied to the microstrip transmission line to be directionally radiated away from the microstrip transmission line at the antenna portion, the direction of radiation being a function of the frequency of the supplied energy. The substrate may have greater capacitance at said antenna portion than at other portions of said substrate.

12 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MICROSTRIP FREQUENCY-SCAN ANTENNA

STATEMENT OF GOVERNMENT INTEREST

The invention described herein may be manufactured, used, and licensed by or for the U.S. Government for governmental purposes without the payment to the inventors of any royalty.

CROSS-REFERENCE TO RELATED APPLICATION

This application is related to Ser. No. 07/833,259, filed on Feb. 10, 1992 by the same inventors, and titled SWITCHABLE SCAN ANTENNA ARRAY, the disclosure of which are incorporated by reference herein, now U.S. Pat. No. 5,144,320.

BACKGROUND OF THE INVENTION

The invention relates generally to a frequency-scan antenna for the millimeter-wave region, and more particularly to such an antenna having a ramped-microstrip construction.

Frequency-scan antennas are employed to provide inertialess electronic scan capability in the millimeter-wave region, particularly for radar systems. The inertialess scan feature is particularly important for surveillance, obstacle-avoidance and target-acquisition radars.

Antennas and antenna arrays of background interest are described in Stern et al., A MM-Wave Homogeneous Ferrite Phase Scan Antenna, Microwave Journal, Vol. 30, No. 4, pp. 101–108 (April 1987); Borowick et al., Inertialess Scan Antenna Techniques for Millimeter Waves, 9th DARPA/Tri-Service MMWave Conference Record (1981); and Collier, Microstrip Antenna Array for 12 GHz TV, Microwave Journal, Vol. 20, No. 9, pp. 67–71. See also Stern et al., U.S. Pat. No. 4,754,237 issued Jun. 28, 1988, titled Switchable Millimeter Wave Microstrip Circulator. The contents of all noted prior art materials are incorporated by reference herein.

SUMMARY OF THE INVENTION

Despite the advantages of the known systems, there remains a continuing need for a planar design for an electronic-scan antenna which is simple, efficient and cost-effective. The present invention satisfies this need by providing a frequency-scan antenna which a microstrip-type transmission-line structure, mountable on a single microstrip substrate, offering the advantages of a small planar footprint, simple construction, light weight, and low loss.

According to a particularly advantageous embodiment of the invention, an antenna comprises a microstrip transmission line which includes a strip conductor and a ground plane separated by a dielectric substrate; a portion of the substrate being adapted to enable energy within the substrate to radiate away from the microstrip transmission line. To permit frequency-scanning, the substrate has an antenna portion formed therein which is adapted to permit energy supplied to the microstrip transmission line to be directionally radiated away from the microstrip transmission line at the antenna portion, the direction of radiation being a function of the frequency of the supplied energy. The antenna portion may have greater capacitance than other portions of the substrate.

Other features and advantages of the present invention will become apparent from the following description of the invention which refers to the accompanying drawings.

DESCRIPTION OF A PREFERRED EMBODIMENT

Figure 1:
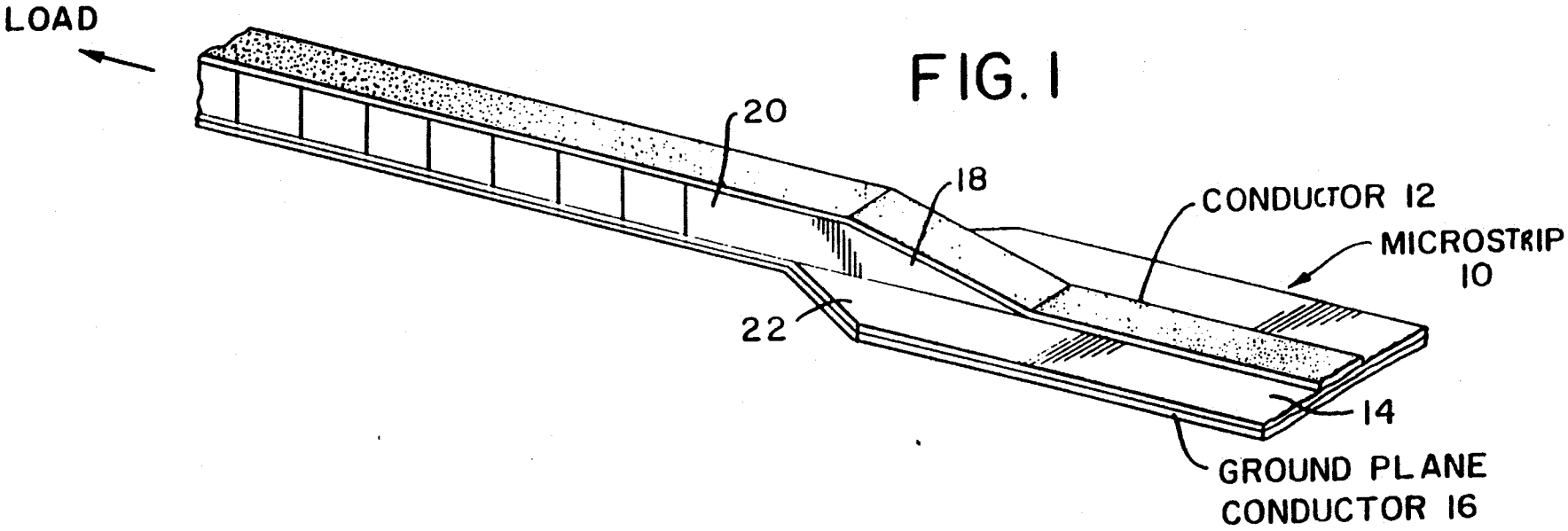
FIG. 1 is a simplified perspective view of an antenna according to a preferred embodiment of the invention.

FIG. 1 is a simplified perspective view of an antenna according to an embodiment of the invention. A basic microstrip structure 10 is formed by a conductor 12, a dielectric substrate 14 and a ground plane conductor 16. The dielectric substrate 14 is typically about 0.010-inch (0.254-mm) thick Duroid (trademark), which is a composition of Teflon (trademark) and fiberglass.

At a ramp portion 18 the thickness of the substrate is increased to about 0.070-inch (1.778-mm) to form a ramp up to a dielectric platform 20 about 0.070-inch thick. The conductor 12 runs up the ramp portion 18 and continues to run across the platform 20.

Formed on one side of the platform 20 is a series of evenly spaced periodic slots. According to one example of the invention, for operation at about 35 GHz, the slots are about 0.140-inch (3.556-mm) apart and each slot is about 0.008-inch (0.2032-mm) wide and 0.008-inch deep. The spacing is a function of the wavelength and the dielectric constant.

The RF signal injected into the microstrip line enters into the thicker high-dielectric-constant platform section with low transition and transmission loss. The top microstrip conductor and bottom ground plane, together with the high-dielectric-constant platform section, confine the energy to be radiated out of the side of the antenna. As the signal travels through the antenna section and experiences a side wall slot, a portion of the energy is radiated out of the slot, the slot being a discontinuity for the propagating wave. This occurs for each successive slot, each slot radiating a portion of the incident power. The periodic nature of the energy radiating from the slots results in the formation of an antenna beam pattern. Any residual RF energy traveling down the length of the antenna beyond the slotted section is dumped into an absorbing load.

Figure 2:
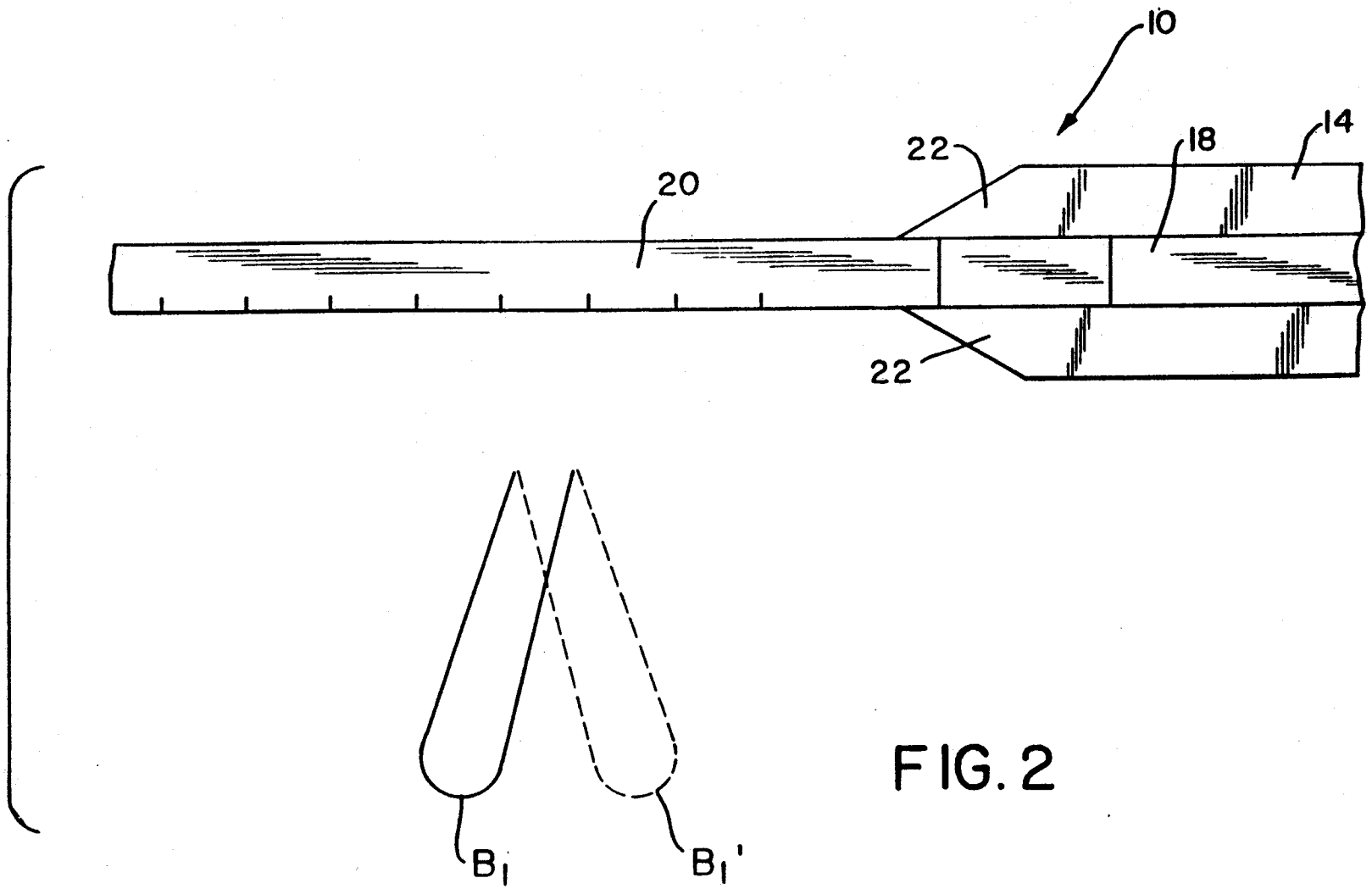
FIG. 2 is a plan view of the antenna of FIG. 1, the conductor strip not being shown, schematically showing its radiation pattern.

By changing the frequency of the input energy, the position of the radiating beam can be shifted as shown in the top view of FIG. 2, in which the solid line $B_1$ shows the radiation pattern at one frequency and the dotted line $B_1'$ shows the radiation pattern at another frequency.

Adjacent approximately the full length of the platform 20, the substrate has substantially the same width as the platform 20. Near the ramp portion 18 the substrate has tapered portions 22 on each side where the substrate widens, so that away from the platform, the substrate extends away from the microstrip by approximately 1 to 2 times the width of the microstrip. These widened portions of the substrate provide a widened ground plane 16, which helps to contain the electric field in the substrate between the conductor 12 and the ground plane 16.

On the other hand, the platform 20 is made of a low-loss microwave-type dielectric material, for example MgTi. Its dielectric constant is about 12, while that of the Duroid substrate is about 2. With the high dielectric constant of the platform 20, the extended ground plane is not necessary to contain the field and furthermore would distort the radiation pattern of the antenna if it were present.

The precise location of the tapered portions 22 is not believed to be critical. The ground plane should start to widen between the last slot and the top of the ramp, and preferably near the top of the ramp.

Although the present invention has been described in relation to a particular embodiment thereof, variations and modifications and other uses will become apparent to those skilled in the art. It is preferred, therefore, that the present invention be limited not by the specific disclosure herein, but only by the appended claims.

What is claimed is:

1. An antenna, comprising:

a microstrip transmission line which includes a strip conductor and a ground plane conductor separated by a dielectric substrate;

the substrate having means enabling energy within said substrate to radiate away from said microstrip transmission line.

2. A frequency-scan antenna, comprising:

a microstrip transmission line which includes a strip conductor and a ground plane conductor separated by a dielectric substrate;

the substrate having an antenna portion formed therein having means permitting RF energy supplied to said microstrip transmission line to be directionally radiated away from said microstrip transmission line at said antenna portion, the direction of radiation being a function of the frequency of said supplied energy.

3. An antenna as in claim 2, wherein said antenna portion is defined by a platform between said strip conductor and said ground plane conductor at said antenna portion which is substantially thicker than at other portions of said substrate.

4. An antenna as in claim 3, wherein said means comprises lateral slots formed in said platform permitting lateral radiation therefrom of said supplied energy.

5. An antenna as in claim 4, wherein said slots are spaced with substantially equal spacing, thereby permitting the radiated energy to be scanned by changing the frequency of the supplied energy.

6. An antenna as in claim 5, wherein said spacing is selected as a function of the frequency of the supplied energy and of the dielectric constant of the platform.

7. An antenna as in claim 2, wherein said substrate has greater capacitance at said antenna portion than at said other portions of said substrate.

8. An antenna as in claim 2, wherein the substrate has a higher dielectric constant at said antenna portion than at said other portions.

9. An antenna as in claim 8, wherein the dielectric constant at said antenna portion is substantially 6 times that at said other portions.

10. An antenna as in claim 9, wherein the dielectric constant at said antenna portion is substantially 12 and that at said other portions is substantially 2.

11. An antenna as in claim 8, wherein said antenna portion is defined by a platform between said strip conductor and said ground plane conductor at said antenna portion which is substantially thicker than at other portions of said substrate.

12. An antenna as in claim 11, wherein said means comprises lateral slots formed in said platform permitting lateral radiation therefrom of said supplied energy.

* * * * *